United States Patent Office 2,982,686
Patented May 2, 1961

2,982,686
ARYLPHOSPHATE COMPOUNDS

Richard R. Whetstone and Alan R. Stiles, Modesto, Calif., assignors to Shell Oil Company, New York, N.Y., a corporation of Delaware No Drawing. Filed Dec. 23, 1957, Ser. No. 704,342

18 Claims. (Cl. 167—30)

This invention relates to novel complex aryl compounds which contain phosphorus and to the employment of these compounds as insecticides. Certain organic phosphorus-containing compounds have become important in recent years because of their potency as insecticides. For example, Stiles, U.S. 2,685,552 (Shell Development Company), describes 2 - (methoxycarbonyl)-1-methylvinyl dimethyl phosphate as an insecticide of outstanding toxicity. In spite of their impressive initial toxicity, many of these phosphorus compounds are effective for only a short time, and are consequently less valuable or altogether useless in those situations calling for extended residual toxicity. The need for potent phosphorus-containing insecticides manifesting extended residual toxicity has thus become increasingly manifest. The novel insecticides of the present invention satisfy this urgent need without sacrificing the characteristic potency and other advantages of these known organic-phosphorus insecticides. The principal object of the present invention is then to provide organic phosphorus containing insecticidal compounds evidencing high initial potency, extended residual toxicity, yet which are relatively inexpensive to synthesize and formulate.

Another object of the present invention is to provide insecticidal compositions containing these compounds.

Yet another object of the present invention is to provide a method of combating insects comprising essentially contacting insects with these novel compounds.

Other objects, features and advantages of the present invention will be apparent from the following description read in conjunction with the appended claims.

The new and novel compounds encompassed by the present invention may be represented by the following structural formula:

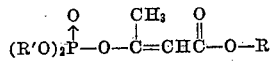

wherein R is an aralkyl or aryl radical. When R is an aralkyl radical the alkyl portion may contain 1–5 carbon atoms and is a branched or straight chain. The alkyl portion of the aralkyl group is preferably methyl. When R is an aralkyl group the aryl portion of the molecule may be a phenyl or tolyl group. The aryl portion of the molecule may be unsubstituted or substituted with an alkoxy group, particularly methoxy group. R' is a lower alkyl radical with may contain 1–5 carbon atoms. Methyl is preferred. Specific examples of compounds encompassed by the present invention are: dimethyl 1-methyl-2-(5-phenylpentyloxycarbonyl) vinyl phosphate, dimethyl 1 - methyl-2-(2-benzyloxyethoxycarbonyl)vinyl phosphate, dimethyl 1-methyl-2-(tolyloxycarbonyl)vinyl phosphate, dimethyl 1 - methyl - 2 - (phenoxycarbonyl)-vinyl phosphate, 2-(benzyloxycarbonyl)-methylvinyl dimethyl phosphate, 2 - (p-methoxyphenoxycarbonyl) - 1-methylvinyl dimethyl phosphate, diethyl 1-methyl-2-(p-tolyloxycarbonyl)vinyl phosphate, 1 - methyl - 2-(phenethoxycarbonyl)vinyl dipropyl phosphate, 2-(p-methoxybenzyloxycarbonyl)-1-methylvinyl dimethyl phosphate, dimethyl 2-(alpha-methyl-benzyloxycarbonyl)-1-methylvinyl phosphate, dimethyl 1-methyl-2-(2-phenoxyethoxycarbonyl)vinyl phosphate, and 1-methyl-2-(5-phenylpentyloxycarbonyl)vinyl dipentyl phosphate. Other compounds of the present invention are hereinafter described.

The novel compounds of the present invention can be prepared by any of the methods known in the art for synthesizing compounds of this general character. If desired compounds of the present invention may be prepared by reacting trialkyl phosphite with the appropriate aryl haloacetoacetate as shown in the following general formula:

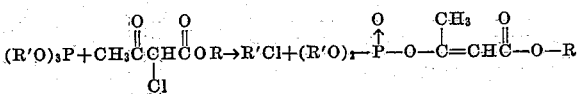

In this equation R is an aralkyl or aryl radical as defined above and R' is a lower alkyl radical as defined above.

The preparations of the specific compounds of the present invention are illustrated by the following examples:

I. DIMETHYL 1-METHYL-2-(PHENOXYCARBONYL)VINYL PHOSPHATE

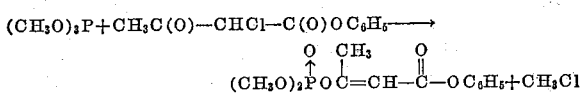

59 g. (0.475 mole) (about 10% excess) of trimethyl phosphite were added at 80–100° over 1 hour to 92 g. (0.433 mole) of phenyl 2-chloroacetoacetate. The mixture was heated for 1 hour at 100–110°, then at 80°/170 mm. for 1 hour. Total cold trap contents: 19.5 g. CH₃Cl (89.1% of theory).

This material was stripped in a molecular still and then distilled to give 19 g. (100–105°/0.001 mm.) and a residue of 99 g. The residue was distilled yielding 84.0 g. (110–112°/0.001 mm.) and a residue of 15.0 g.

The distillate of 84 g. (67.7% theory) analyzed as follows:

|    | Found | Calc. (PO$_6$C$_{12}$H$_{15}$) |
|----|-------|--------------------------------|
| C  | 50.2  | 50.3 |
| H  | 5.3   | 5.2 |
| Cl | None  | None |
| P  | 10.8  | 10.82 |

It will be understood that the corresponding diethyl-, dipropyl, dibutyl- and dipentyl vinyl phosphate may be prepared by employing triethyl-, tripropyl-, tributyl- or tripentyl phosphite respectively.

II. 2-(BENZYLOXYCARBONYL)-1-METHYLVINYL DIMETHYL PHOSPHATE

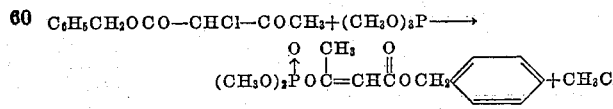

Benzyl 2-chloroacetoacetate 142 g. (0.626 mole) was placed in a 500 cc. three-necked round bottom flask fitted with stirrer, dropping funnel and a 4-tube carrying a thermometer and reflux condenser attached to an aceton-Dry Ice trap for collecting evolved CH₃Cl. After heating this compound to 80°, trimethyl phosphite (84 g., 80 cc., 0.676 mole) was added slowly during one hour with stirring. The temperature rose during the addition to 120° and after the addition the reaction was held at 120–125° for one hour. It was then stripped to 100° at house vacuum pressure. The cold trap contents weighed 29 g., B.P. −24°.

This reaction product was distilled on the molecular still at 135–145° at 0.0001 mm. to give 103 g., $n_D^{25}$ 1.5067. The residue was distilled at 140–145°/0.0001 mm. to give 63 g., $n_D^{25}$ 1.5072, and a residue $n_D^{25}$ 1.5079, 12 g. which was discarded.

The distillate of 63 g. (55% theory) analyzed as follows:

|   | Found | Calc. ($C_{13}H_{17}PO_6$) |
|---|---|---|
| C | 51.3 | 52.04 |
| H | 5.3 | 5.71 |
| Cl | .1 | 0 |
| P | 9.7 | 10.32 |

It will be understood that the corresponding diethyl-, dipropyl-, dibutyl-, and dipentyl-, phosphates may be prepared by employing the triethyl-, tripropyl-, tributyl-, or tripentyl phosphite respectively.

III. 2-(p-METHOXYPHENOXYCARBONYL)-1-METHYLVINYL DIMETHYL PHOSPHATE

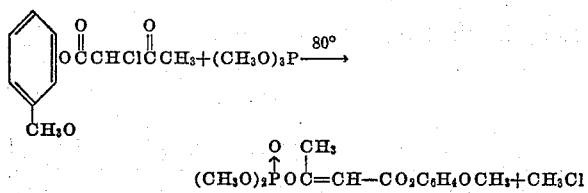

70 g. of p-methoxyphenyl 2-chloroacetoacetate were placed in a 300 cc. round bottom 3-necked flask fitted with dropping funnel, mechanical stirrer, and 4-tube carrying a thermometer and reflux condenser attached to a cold trap for collection of evolved $CH_3Cl$ 42 g. of trimethyl phosphite was added dropwise with stirring to the heated (to 80°) contents of the flask over a period of 30 minutes. The reaction was exothermic and the temperature rose steadily to 105° at which point the flask was cooled to 95° and maintained between 95° and 105° with cooling. After complete addition, the contents of the flask was further heated to 105° and stirred for an additional 1.5 hours. The cold trap contained 12 g., B.P. −23° C. The reaction mixture was stripped to 80°/7 mm. and the residue stripped on the molecular still at 55°/.0005 mm. to yield 80 g. of residue. The residue from stripping on the molecular still was distilled at 115–120°/.0005 mm. to yield a distillate which was saved and a residue which was distilled on the molecular still at 158–160/.0005 mm. to give 49 g. distillate and 4 g. of residue which was discarded. The distillates were combined and redistilled on the molecular still at 140°/0.0005 mm. Yield 74.5%.

The distillate analyzed as follows:

|   | Found | Calc. ($C_{13}H_{19}PO_7$) |
|---|---|---|
| C | 50.2 | 49.37 |
| H | 5.6 | 5.42 |
| Cl | 0.7 | 0 |
| P | 9.7 | 9.80 |
|   |   | $n_D^{25}$ 1.5092 d 1.26 |

It will be understood that the corresponding diethyl-, dipropyl-, dibutyl-, and dipentyl phosphates may be prepared by employing the triethyl-, tripropyl-, tributyl-, and tripentyl phosphite respectively.

IV. DIMETHYL 1-METHYL-2-(p-TOLYLOXYCARBONYL)VINYL PHOSPHATE

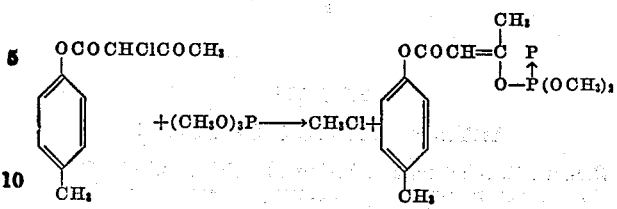

73 g. of p-tolyl 2-chloroacetoacetate were heated to 80° C. in a 300 cc. round bottom 3-necked flask fitted with dropping funnel, stirrer and 4-tube fitted with thermometer and condenser to which is attached a cold trap for collection of methyl chloride. 42 cc. trimethyl phosphite were added dropwise. The reaction was exothermic and the temperature of the reaction mixture rose from 80° to 120°; it was then cooled to 80° and it rose again to 105°. After complete addition (40 minutes) the reaction was stirred an additional 2 hours at a temperature of 105°. It was then stripped to 50° K.T. and 7 mm. pressure.

The reaction mixture was then stripped to 105° K.T. and 0.02 mm. pressure, and distilled on the molecular still after being stripped at 55°/.0005 mm. to give 1 g. of distillate which was discarded and a dark green residue. This residue was distiled at 140°/.0005 mm. to give 80 g. (83% theory of chartreuse-colored distillate and 8 g. of dark green colored residue, the latter of which was discarded. The chartreuse-colored distillate was redistilled on the molecular still at 115–118° and 0.0005 mm. to give 66 g. of fluorescent yellow distillate. Yield 68.2%.

The distillate analyzed as follows:

|   | Found | Calc. ($C_{13}H_{17}PO_6$) |
|---|---|---|
| C | 53.7 | 52.00 |
| H | 5.5 | 5.71 |
| Cl | 1.2 | 0 |
| P | 9.7 | 10.32 |

It will be understood that the corresponding diethyl-, dipropyl-, dibutyl-, and dipentyl vinyl phosphate may be prepared by employing triethyl-, tripropyl-, tributyl-, or tripentyl phosphite respectively.

V. DIMETHYL 1-METHYL-2-(PHENETHOXYCARBONYL)-VINYL PHOSPHATE

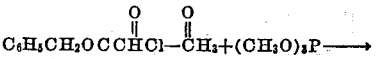

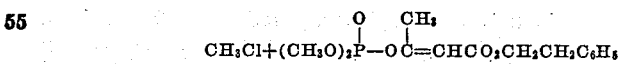

83 g. of 2-phenylethyl 2-chloro-acetoacetate were heated to 80° C. in a 300 cc. round bottom flask fitted with dropping funnel, stirrer, and 4-tube carrying a thermometer and reflux condenser attached to a cold trap for collection of evolved methyl chloride. Trimethyl phosphite (50 cc.) was added dropwise at such a rate that the temperature was maintained (35 minutes required for addition) and then the reaction was maintained at 80° by external heating for 45 minutes and then at 120° for an additional 45 minutes. The reaction mixture was stripped to 50°/.6 mm. The cold trap contained 16 g. of material boiling below 0°. The reaction mixture was then stripped on the molecular still at 55–58°/.0005 mm. From 109 g. crude product there was obtained a distillate of 3 g. which was discarded and a residue of 103 g. This residue was distilled on the molecular still at 140–5°/0.0005 mm. yielding 99 g. of a pale yellow distillate with greenish fluorescence and 4 g. of dark green residue which was discarded. Yield 88.5%. The distillate analyzed as follows:

|   | Found | Calc. (C₁₄H₁₉PO₆) | $d_{25}^{25}$ 1.19 |
|---|---|---|---|
| C | 53.8 | 53.45 | |
| H | 6.0 | 6.09 | $n_D^{25}$ 1.5027 |
| Cl | None | 0 | |
| P | 8.9 | 9.87 | |

It will be understood that the corresponding diethyl dipropyl-, dibutyl- and dipentyl vinyl phosphate may be prepared by employing triethyl-, tripropyl-, a tripentyl phosphite, respectively.

VI. 2-(p-METHOXYBENZYLOXYCARBONYL)-1-METHYLVINYL DIMETHYL PHOSPHATE

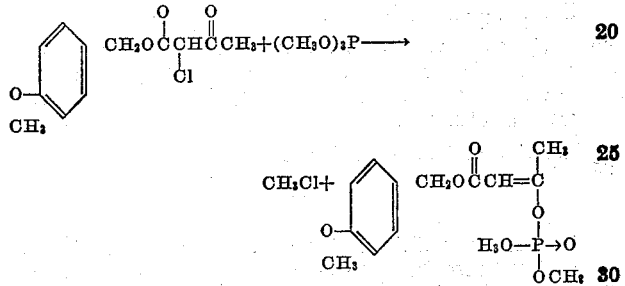

Anisyl 2-chloroacetoacetate, 85 g. (0.33 mole) was stirred and heated to 80° C. in a 300 cc. round bottom 3-necked flask, fitted with dropping funnel, mechanical stirrer and a 4-tube carrying a thermometer and a reflux condenser attached to a Dry Ice-acetone cold trap. Trimethyl phosphite, 47 cc. (10% excess) was added dropwise to the stirred liquid. The reaction was exothermic, so the heating mantle was removed during approximately ⅔ of the addition of the trimethyl phosphite, and the temperature was maintained between 80° and 100°. As the temperature showed signs of falling heating was resumed during the last portion of the addition of the trimethyl phosphite. Addition required 40 minutes. The reaction mixture was then heated to 120–125° and then stirred an additional hour to obtain complete reaction. Cold trap contents 14 g. The reaction was then stripped at the house vacuum and 1 g. of material collected in the cold trap. The residue was transferred to a distillation kettle (200 cc.) The residue was stripped to a K.T. 130°/0.6 mm. pressure and 19 g. of material, $n_D^{25}$ 1.4095, B.P. 32–37°/6 mm. was collected. The remaining 96 g. of crude product was stripped on the molecular still at 60°/.0005 mm. The 5 g. distillate was discarded and the residue of 89 g. was distilled on the molecular still at 138–142°/.0005 mm. The yield of distilled material was 77 g. with a residue of 8 g. which was discarded. This distillate was redistilled on the molecular still at 105–110° to give a distillate 15 g., which was discarded after analysis, and a residue of 58 g. (yield 52.6%) which analyzed as follows:

|   | Found | | Calc(C₁₄H₁₉PO₇) |
|---|---|---|---|
|   | Distillate | Residue | |
| C | | 52.6 | 50.91 |
| H | | 6.4 | 5.80 |
| Cl | 2.5 | .6 | 0 |
| P | | 9.1 | 9.38 |
| $n_D^{25}$ | 1.5205 | 1.5173 | |

It will be understood that the corresponding diethyl-, dipropyl-, dibutyl-, and dipentyl vinyl phosphate may be prepared by employing triethyl-, tripropyl-, tributyl- or tripentyl phosphite respectively.

VII. DIMETHYL 2-(A-METHYLBENZYLOXYCARBONYL)-1-METHYLVINYL PHOSPHATE

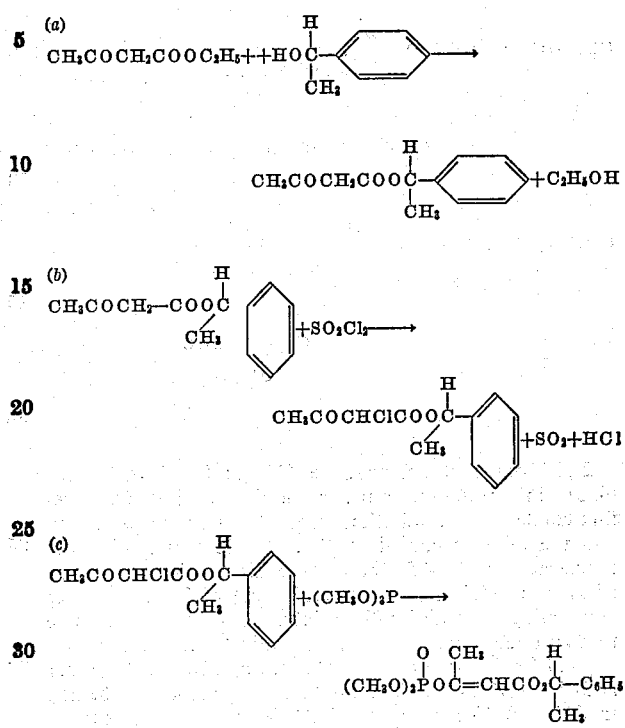

Reaction (a) yielded 153.0 g. of product $n_D^{25}$=1.5042, B.P. 130–134/.06 mm. α-Methylbenzyl acetoacetate (145.0 cc.; 153.0 g.; 0.74 mol) was poured into a 500 cc. 3-neck round bottomed flask equipped with stirrer, refluxed condenser (exit connected to a water trap), dropping funnel and thermometer immersed in the liquid. Then 94.5 g. SO₂Cl₂ (57.0 cc.; 0.70 mol) were added dropwise maintaining the temperature at 10–15° during ½ hour. The reaction mixture was allowed to stand overnight. The lemon-colored liquid was stirred at 20–25° for 1 hour, pumped out by house vacuum for 1 hour at 20–25°, and then by Hy-Vac (0.7–.10 mm.) for 15 minutes. (CH₃O)₃P (92.0 g.; 0.74 mol) was added dropwise to the stirred reaction mixture at such a rate that the temperature was maintained at 50–55° during the 45 minutes required. The mixture was allowed to stand overnight.

The mixture was now heated and stirred at 75–80° for 1 hour and then the house vac applied for 1 hour at the same temperature. The trap contained 35.0 g. of CH₃Cl (97% of theory). The lemon-colored liquid was stripped for 2 hours at 75–80°/.07–.10 mm. and then passed through the molecular still at 80°/10⁻⁵ mm. This product weighed 189.0 g. ($n_D^{25}$ 1.4980) and was distilled at 145–150°/10⁻⁵ mm. yielding 131.0 g. of lemon-colored oil ($n_D^{25}$ 1.4988 $d^{25}$ 1.19, yield 59.6%) which was analyzed as follows:

|   | Found | Calc.(C₁₄H₁₉O₆P) |
|---|---|---|
| C | 52.3 | 53.5 |
| H | 6.1 | 6.04 |
| P | 9.9 | 9.9 |

It will be understood that the corresponding diethyl-, dipropyl-, dibutyl-, and dipentyl vinyl phosphate may be prepared by employing triethyl-, tripropyl-, or tripentyl phosphite, respectively.

VIII. DIMETHYL 1-METHYL-2-(2-PHENOXY-ETHOXYCARBONYL)VINYL PHOSPHATE

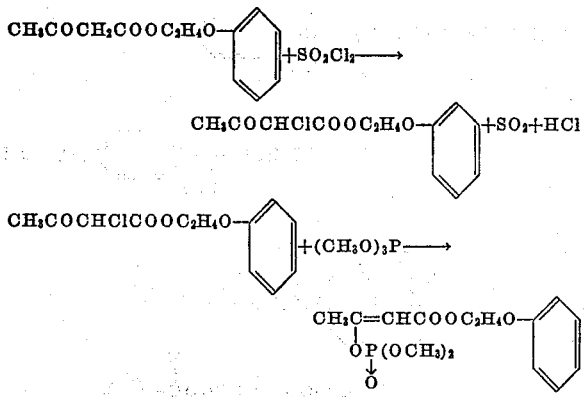

2-phenoxyethyl acetoacetate (78 g.; 0.352 mol) was placed in a round-bottom flask equipped with stirrer, reflux condenser and addition tube. The stirrer was started and the mixture cooled to 10°. While maintaining the temperature at 10–15° there was added during the course of ¾ hour 45.0 g. (27 cc.; 0.333 mol) of $SO_2Cl_2$. After completing the addition the mixture was allowed to come to room temperature (20 to 30 min.) then house vac. applied for ½ hour at 50° followed by Hy-Vac (5 mm.) at 50° for ½ hour. The mixture was stirred and heated to 65° and 43.5 cc. of $(CH_3O)_3P$ was added at such a rate that the temperature was maintained at 70–75°. During ½ hr. of the addition heating was necessary. After final addition heat was maintained at 75–80° for ½ hour. Then house vac. was applied at same temperature for another 15 minutes. There was obtained 15.0 g. of $CH_3Cl$ in the trap (90% theory). The yellow oil was stripped at 100–10°/10$^{-5}$ and then distilled at 170–5°/10$^{-5}$ mm. yielding 92.0 g. (83.5% theory)

$$d = \frac{92}{75} = 1.2$$

$n_D^{25} = 1.5072$, a residue of 10 cc. (12.0 g.) and 4.0 cc. liquid in trap—colorless and having odor of $(CH_3O)_3P$. Since product contained chlorine, it was stripped at 130–35°/10$^{-5}$ mm. yielding 55.0 ml. of stripped yellow oil and 13.0 ml. of colorless distillate $n_D^{25} = 1.5078$. The stripped oil was then distilled at 150–5°/10$^{-5}$ mm. Thus was obtained 43.0 cc. (54.0 g.) $d$ 1.3 of colorless oil (yield 48.5%) and 8.5 cc. (10.0 g.) of yellow residue. The distillate was analyzed as follows:

|   | Found | Calc. ($C_{14}H_{19}O_7P$) |
|---|---|---|
| C | 50.8 | 50.91 |
| H | 4.6 | 5.80 |
| P | 9.4 | 9.38 |
| Cl | .7 | 0. $0n_D^{25}$ 1.5078 |

Similar to the preceding examples homologs of this phosphate may be made by employing triethyl-, tripropyl-, tributyl-, tripentyl phosphite, etc.

That the compounds of the present invention possess insecticidal activity is shown by the following table. The relative toxicity, i.e., toxicity index, given in this table for each compound represents the ratio of the concentration in weight percent of the standard at which under standard test conditions, a 50% mortality of the insects in each test was observed, to the concentration in weight percent of the toxic agent in the solvent at which, under standard test conditions, a 50% mortality of the insects in each test was observed.

Relative toxicity (toxicity index)

$$= \frac{LD_{50} \text{ of the standard}}{LD_{50} \text{ of a test sample}} \times 100$$

In these tests dieldrin was used as a standard for tests against houseflies and southern army worms. Parathion was employed as a standard with pea aphids, Mexican bean beetle larvae and two-spotted spider mites. The quantity of standard employed to give 50% mortality of the insects in each test was arbitrarily given a numerical value of 100. The toxicity of a representative product of the invention against the common housefly (*Musca domestica*) was determined generally following the method described by Y.P. Sun, Journal of Economic Entomology, volume 43, page 45 et seq. (1950). Solutions or emulsions of representative compounds were made up by employing acetone or a neutral petroleum distillate lying within the kerosene range as a solvent. These solutions were tested for toxicity against insects listed in the table by spraying groups of plants infested with the insects under controlled conditions which varied from test to test only in the concentration of toxicant. In the case of the two-spotted spider mites rotating pre-infested bean plants were sprayed at low volume through a horizontal tunnel with water solutions or suspensions of the toxicants by the method described by Dorman and Hall (Journal Economic Entomology 46; 151, 1953). Mammalian toxicity tests were also conducted on male mice.

*Relative toxicity of new compounds*
[Toxicity index (standard=100)]

| Compound Name | House Fly Dieldrin[1] | Pea Aphid Parathion[1] | Mexian Bean Bettle Larva Parathion[1] | Southern Armyworm Dieldrin[1] | Two-spotted Spider Mite Parathion[1] | Toxicity Male Mice, Mg/Kg. |
|---|---|---|---|---|---|---|
| Dimethyl 1-methyl-2-(phenoxycarbonyl)vinyl phosphate | 13.4 | 18 | 51 | 9 | 22 | 390 |
| 2-(benzyloxycarbonyl)-1-methylvinyl dimethyl phosphate | 18.6 | 89 | 123 | 27 | 235 | 71 |
| 2-(p-Methoxyphenoxycarbonyl)-1-methylvinyl dimethyl phosphate | 18 | 17 | 51 | 22 | 39 | 101 |
| Dimethyl 1-methyl-2-(p-tolyloxycarbonyl)vinyl phosphate | 13.5 | 22 | 24 | 7 | 44 | 176 |
| Dimethyl 1-methyl-2-(phenethoxycarbonyl)vinyl phosphate | 6 | 73 | 64 | 9 | 118 | 22 |
| 2-(p-methoxybenzyloxy-carbonyl)1-methylvinyl dimethyl phosphate | 15 | 21 | 68 | 8 | 121 | 116 |
| Dimethyl 2-(alpha-methylbenzyloxycarbonyl)-1-methylvinyl phosphate | 20 | 95 | 136 | 26 | 653 | 48 |
| 1-methyl-2-(2-phenoxyethoxycarbonyl)vinyl phosphate | 9 | 13 | 73 | 17 | 144 | 7.8–15.6 |

[1] Standard.

That the compounds of the present invention exhibit a surprising residual toxicity when compared with 2-(methoxycarbonyl)-1-methylvinyl dimethyl phosphate, is illustrated by tests conducted against the boll weevil and two-spotted mite.

The initial and residual toxicity of each of the compounds of the present invention to boll weevils when sprayed at the rate of 0.5 lb./acre on boll weevils caged on field treated cotton plants is shown in the following table. 2-(methoxycarbonyl)-1-methylvinyl dimethyl-phosphate was found to be ineffective two days after spraying whereas compounds of the present invention were found to possess significant insecticidal activity two days after spraying.

Against the two-spotted mite pre-infested bean plants were heated with low volume sprays of the test chemical at concentrations of 20 and 40 times its $LD_{50}$/value, i.e., the amount by weight of test chemical effecting a 50% initial insect kill. Seven days after spray, total living mites were counted and expressed as percent reduction from the check. The compounds of the present invention were superior to 2-methoxycarbonyl)-1-methylvinyl dimethyl phosphate in all recorded tests.

| Compound Name | Residual Percent Mortality on Reduction | | | | | |
|---|---|---|---|---|---|---|
| | Boll Weevil at 0.5 lb./acre—Days after Spray | | | | 2-Spotted Mite 7 Days at Factor $\times LD_{50}$ | |
| | 0 | 1 | 2 | 3 | 20× | 40× |
| 2-(methoxycarbonyl)-1-methylvinyl dimethyl phosphate | 96 | 36 | 0 | | 59 | 78 |
| 2-(benzyloxycarbonyl)-1-methylvinyl dimethyl phosphate | 68 | 70 | 26 | 25 | 73 | 83 |
| 2-(p-Methoxybenzyloxycarbonyl)-1-methylvinyl dimethyl phosphate | 63 | 90 | 64 | 25 | 92 | 95 |
| Dimethyl 2-(α-methylbenzyloxycarbonyl)-1-methylvinyl phosphate | 74 | 38 | 13 | | | |

The compounds of this invention can be employed for insecticidal purposes by the use of any of the methods which are conventionally employed in the art. For example, the compounds can either be sprayed or otherwise applied in the form of a solution or dispersion, or they can be absorbed on an inert, finely divided solid and applied as a dust. Useful solutions for applications by spraying, brushing, dipping, and the like, can be prepared by using as the solvent any of the well-known inert horticultural carriers, including neutral hydrocarbons such as kerosene and other light mineral oil distillates of intermediate viscosity and volatility. Adjuvants, such as spreading or wetting agents, can also be included in the solutions, representative materials of this character being fatty acid soaps, rosin salts, saponins, gelatine, casein, long chain fatty alcohols, alkyl aryl sulfonates, long-chain alkyl sulfonates, phenol-ethylene oxide condensates, $C_{12}$ to $C_{20}$ amines and ammonium salts, and the like. These solutions can be employed as such, or more preferably, they can be dispersed or emulsified in water and the resulting aqueous dispersion or emulsion applied as a spray. Solid carrier materials which can be employed include: talc, bentonite, lime, gypsum, pyrophyllite and similar inert solid diluents. If desired, the compounds of the present invention can be employed as aerosols, as by dispersing the same into the atmosphere by means of a compressed gas.

The concentration of the compounds to be used with the above carriers is dependent upon many factors, including the particular compound utilized, the carrier employed, the method and conditions of application, and the insecticide species to be controlled, a proper consideration and resolution of these factors being within the skill of those versed in the insecticide art. In general, however, the compounds of this invention are effective in concentrations of from about 0.01% to 0.5% based upon the total weight of the composition though under the same circumstances as little as about 0.00001% or as much as 2% or even more of the compound can be employed with good results from an insecticidal standpoint.

When employed as an insecticide, a compound of this invention can be employed either as the sole toxic ingredient or the insecticidal composition or it can be employed in conjunction with the other insecticidally-active materials. Representative insecticides of this latter class include the naturally-occurring insecticides such as pyrethrum, rotenone, sabadilla, and the like, as well as the various synthetic insecticides, including DDT, benzene hexachloride, thiodiphenylamine, cyanides, tetraethyl pyrophosphate, diethyl p-nitrophenyl thiophosphate, azobenzene, and the various compounds of arsenic, lead, and/or fluorine.

Having thus described this invention in full what is desired to be protected by United States Letters Patent is:

1. A compound of the general formula:

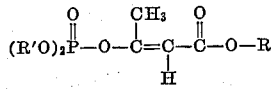

wherein R is selected from the group consisting of mononuclear aryl hydrocarbon radicals, mononuclear aralkyl hydrocarbon radicals wherein the alkyl moieties contain from 1 to 5 carbon atoms, and such aryl and aralkyl radicals substituted by a methoxy group, and R' is an alkyl radical containing from 1 to 5 carbon atoms.

2. Dialkyl 1-methyl-2-(aryloxycarbonyl)vinyl phosphate wherein each of the alkyl groups contains from 1 to 5 carbon atoms and the aromatic moiety of the aryl group is the phenyl moiety.

3. Dialkyl 1-methyl-2-(aralkyloxycarbonyl)vinyl phosphate wherein each of the alkyl groups and the alkyl moiety of the aralkyl group contains from 1 to 5 carbon atoms and the aromatic moiety of the aralkyl group is the phenyl moiety.

4. Dimethyl 1-methyl-2-(phenoxycarbonyl)vinyl phosphate.

5. 2-(benzyloxycarbonyl)-1-methyl-vinyl dimethyl phosphate.

6. 2-(p-methoxybenzyloxycarbonyl)-1-methylvinyl dimethyl phosphate.

7. 2-phenoxyethyl 3-(dimethoxy-phosphinyloxy)crotonate.

8. 2-(p-methoxyphenoxycarbonyl)-1-methylvinyl dimethyl phosphate.

9. The method of combating insects which comprises applying to insect habitats a compound of claim 1.

10. The method of combating insects which comprises applying to insects' habitats a compound of claim 2.

11. The method of combating insects which comprises applying to insect habitats a compound of claim 3.

12. The method of combating insects which comprises applying to insect habitats dimethyl 1-methyl-2-(phenoxycarbonyl)-vinyl phosphate.

13. As an insecticidal composition of matter a compound of claim 1 supported upon a finely divided inert carrier material, the concentration of said compound being from about 0.00001 to about 2 percent of the combined weights of said compound and said carrier material.

14. As an insecticidal composition of matter a compound of claim 1 disseminated in an inert horticultural carrier liquid, the concentration of said compound being from about 0.00001 to about 2 percent of the combined weights of said compound and said carrier liquid.

15. Dimethyl 2-(alpha-methylbenzyloxycarbonyl)-1-methylvinyl phosphate.

16. The method of combatting insects which comprises applying to insect habitats a compound of claim 15.

17. As an insecticidal composition of matter dimethyl 2-(alpha-methylbenzyloxycarbonyl)-1-methylvinyl phosphate supported upon a finely divided inert carrier material, the concentration of said phosphate being from about 0.00001 to about 2 percent of the combined weights of said phosphate and said carrier material.

18. As an insecticidal composition of matter dimethyl 2-(alpha-methylbenzyloxycarbonyl)-1-methylvinyl phosphate disseminated in an inert horticultural carrier liquid, the concentration of said phosphate being from about 0.00001 to about 2 percent of the combined weights of said phosphate and said carrier liquid.

References Cited in the file of this patent

UNITED STATES PATENTS

| | | |
|---|---|---|
| 2,582,204 | Kosolapoff | Jan. 8, 1952 |
| 2,802,855 | Whetstone | Aug. 13, 1957 |
| 2,816,128 | Allen | Dec. 10, 1957 |
| 2,826,529 | Shapiro | Mar. 11, 1958 |
| 2,830,069 | Smith | Apr. 8, 1958 |
| 2,838,478 | Hillyer | June 10, 1958 |
| 2,842,497 | Watson | July 8, 1958 |
| 2,894,018 | Lorenz | July 7, 1959 |
| 2,895,982 | Stiles | July 21, 1959 |